(12) United States Patent
De La Calle Lizarazu et al.

(10) Patent No.: US 10,179,429 B2
(45) Date of Patent: Jan. 15, 2019

(54) DEVICE FOR POLYMERISING LACTAMS IN MOULDS

(71) Applicant: FUNDACIÓN TECNALIA RESEARCH & INNOVATION, Derio (ES)

(72) Inventors: Amaia De La Calle Lizarazu, Derio (ES); Cristina Elizetxea Ezeiza, Derio (ES); Sonia García Arrieta, Derio (ES)

(73) Assignee: FUNDACIÓN TECNALIA RESEARCH & INNOVATION, Derio (ES)

( * ) Notice: Subject to any disclaimer, the term of this patent is extended or adjusted under 35 U.S.C. 154(b) by 246 days.

(21) Appl. No.: 15/101,326

(22) PCT Filed: Dec. 3, 2013

(86) PCT No.: PCT/ES2013/070838
§ 371 (c)(1),
(2) Date: Jun. 2, 2016

(87) PCT Pub. No.: WO2015/082728
PCT Pub. Date: Jun. 11, 2015

(65) Prior Publication Data
US 2016/0303780 A1 Oct. 20, 2016

(51) Int. Cl.
*B29C 45/00* (2006.01)
*B29B 7/74* (2006.01)
(Continued)

(52) U.S. Cl.
CPC ........ *B29C 45/0001* (2013.01); *B29B 7/7457* (2013.01); *B29C 67/246* (2013.01);
(Continued)

(58) Field of Classification Search
CPC .. B29B 7/7457; B29C 45/0001; B29C 67/246
(Continued)

(56) References Cited

U.S. PATENT DOCUMENTS 2,885,268 A * 5/1959 Breer et al. ............... B29B 7/32
239/428
3,505,448 A 4/1970 Zijp et al.
(Continued)

FOREIGN PATENT DOCUMENTS

| CH | 542707 A | 10/1973 |
|---|---|---|
| EP | 2338665 A1 | 6/2011 |
| EP | 2743061 A1 | 6/2014 |
| JP | 5859817 A | 4/1983 |
| WO | 2011006648 A1 | 1/2011 |

OTHER PUBLICATIONS

International Search Report dated Jul. 29, 2014 re: Application No. PCT/ES2013/070838; pp. 1-4; citing: WO 2011/006648 A1, EP 2 338 665 A1, EP 2 743 061 A1, CH 542 707 A, U.S. Pat. No. 4,233,433 A, U.S. Pat. No. 3,752,623 A and JP S58 59817 A.

*Primary Examiner* — Jill L Heitbrink
(74) *Attorney, Agent, or Firm* — Cantor Colburn LLP

(57) ABSTRACT

A device for polymerizing lactams in molds includes a hopper for storing solid lactam and a lactam feeding component that includes a plasticizing screw so as the lactam to be melted and simultaneously taken in a dosed manner to a mixing chamber. The device further includes a first dosing component to feed a liquid initiator, and a second dosing component to feed a liquid activator. The mixing chamber is configured to receive in a dosed manner the lactam, the initiator, and the activator from the feeding and dosing components. The mixing chamber has three separate inlets to receive, separately, the lactam, the initiator, and the activator, to allow them to flow into the mixing chamber coming into contact with one another for the first time, at the moment immediately prior to entering into a mold located adjacent the chamber and arranged for the polymerization reaction to take place inside the mold.

11 Claims, 2 Drawing Sheets

(51) Int. Cl.
 *B29C 67/24* (2006.01)
 *B29K 105/00* (2006.01)
 *B29K 77/00* (2006.01)
 *B29L 31/00* (2006.01)
(52) U.S. Cl.
 CPC ...... *B29K 2077/00* (2013.01); *B29K 2077/10* (2013.01); *B29K 2105/0002* (2013.01); *B29K 2105/0067* (2013.01); *B29K 2867/046* (2013.01); *B29L 2031/00* (2013.01)
(58) Field of Classification Search
 USPC ...................................... 264/328.6
 See application file for complete search history.

(56) References Cited

U.S. PATENT DOCUMENTS

| | | | |
|---|---|---|---|
| 3,752,623 A | 8/1973 | Sinn et al. | |
| 4,233,433 A | 11/1980 | Hartmann | |
| 4,404,360 A | 9/1983 | Hartmann | |
| 6,435,854 B1* | 8/2002 | Sawa | B01F 5/045 |
| | | | 425/130 |
| 2011/0148000 A1* | 6/2011 | Garcia Arrieta | B29B 7/407 |
| | | | 264/334 |
| 2012/0114785 A1* | 5/2012 | Berg | B29C 45/52 |
| | | | 425/564 |
| 2012/0313290 A1 | 12/2012 | Steinbichler et al. | |

\* cited by examiner

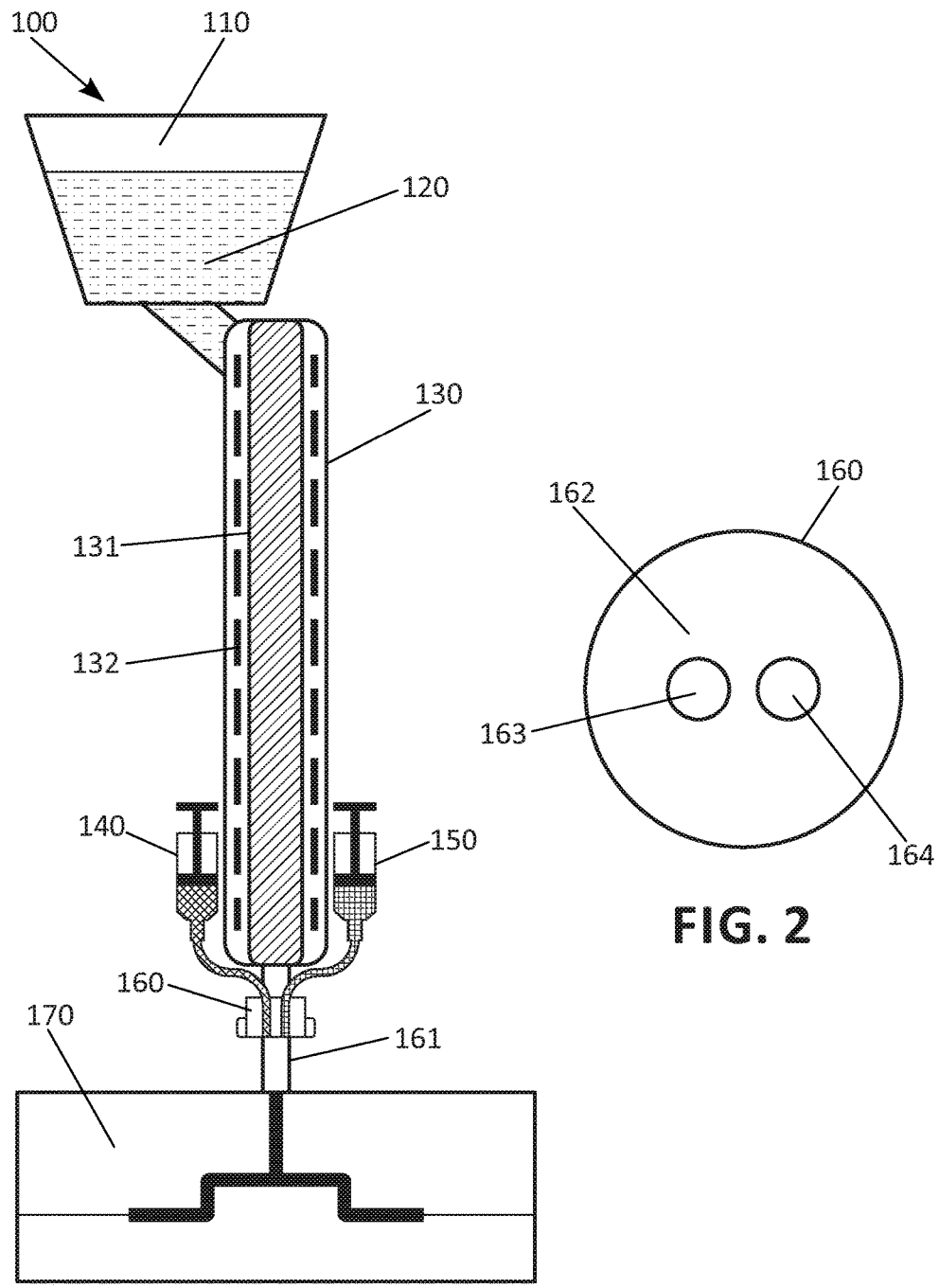

US 10,179,429 B2

DEVICE FOR POLYMERISING LACTAMS IN MOULDS

TECHNICAL FIELD

The present disclosure relates to the techniques used in the chemical industry for polymerizing lactams and, more particularly, it relates to a system for polymerizing lactams in molds.

BACKGROUND

The polymerization of lactams in molds has been used and studied for decades. The latest efforts to improve the technique to polymerize lactams have been focused in modifying the catalytic system (formed by the activator and initiator) in order to carry out the polymerization in a controlled and selective manner. Nevertheless, the way in which the basic ingredients are mixed and fed into the mold has not been modified, and still, basically includes the following steps: Two independent premixtures are prepared, the first one comprising a mixture of the activator and a fraction of the lactam, and the second one comprising the initiator and the remaining fraction of the lactam. Both premixtures are subsequently combined to carry out the polymerization. An example of this way of polymerization can be found in the U.S. Pat. No. 3,505,448.

The prior art techniques allow producing serial parts of one and same composition, but they are not suitable in the continuous manufacture of non-serial parts, for example with individual sizes and/or geometries, different characteristics or compositions.

Based always in this system of premixing the lactam with the initiator and the lactam with the activator, there are different systems for dosing premixtures. One possible technique is based on using gear pumps, as described for example in the U.S. Pat. No. 4,404,360-A. In U.S. Pat. No. 4,404,360-A a pair of tanks are used for the premixtures. An alternative technique is based on using a couple of extruders for making the premixtures and dosing them, as described in the United States patent application US 2012/0,313,290-A1. US 2012/0,313,290-A1 describes a process for the production of fiber-reinforced thermoplastic parts and an injection-molding machine. The injection-molding machine has a first extruder screw for liquefying and mixing a polymeric precursor and an activator and a second extruder screw for liquefying and mixing a polymeric precursor and a catalyst. In a chamber the contents, which have been previously liquefied in the extruder screws, are mixed, and then poured into a mold, where the polymerization takes place.

European patent application EP 2,338,665-A1 describes a process and device for polymerizing lactams in molds, in which the lactam, the activator and the initiator are independently fed and dosed into a mixing head that feeds a mold. The described process for polymerizing lactams can be catalyzed by a large group of initiators and activators, some of them being in solid state. Some initiators and activators must be melted and maintained at high temperatures during the whole process. The device described for molding lactams is versatile for a large group of initiators and activators. Said versatility makes the device complicated to use, since it requires heating means in each and every one of the dosing elements of the circuit through which each of these materials (initiator and activators) passes. The three components (lactam, activator and initiator) of the polymerization process are dosed separately. This leads to two of the advantages of the described process: (1) it ensures stability over time, and (2) it allows a different dosage (in %) of each component for each type of manufactured part.

However, it has been observed that melting and dosing the activator and the initiator at high temperatures is complicated. Furthermore, both materials must be added to the mixture in very specific percentages, which complicates its correct dosage using standard gear pumps. In addition, due to the fact that solid initiators and activators must be melted at temperatures higher than room temperature, and their molten state presents viscosities, which depend on temperature, their temperature must be maintained constantly and accurately along the entire dosing process.

The different elements of the device described in the patent document EP 2,338,665-A1 are each heated independently from the rest, by means of individual heating systems, either an electrical system based on resistances or by means of a heat transfer fluid. Nevertheless, the individual heating of these elements entails a cold area in the connecting element (by means of valves, bolts or whatever other connecting means) between elements. For example, the caprolactam becomes solid at temperatures below 70° C., and these cold spots may cause the subsequent cooling and solidification of the monomer, thus clogging the dosing systems.

Moreover, also the melting of the lactam in a pressurized tank at temperatures above 70° C. involves an extremely long time when there is a large amount of solid lactam to be melted (larger than 1 kg). In a continuous manufacturing process, it is preferable to melt the entirety of the lactam needed to manufacture the series of parts planned for a working day. In consequence, the amount of lactam to be melted is usually much larger than 1 kg (between 1 and 1000 kg), and the melting time is too long as a result. Furthermore, the lactam usually remains in a molten state for at least 8 hours, which increases the possibility of absorbing moisture and of possible thermal degradation. The electric consumption of maintaining the lactam tank at a temperature above 70° C. may also be excessive.

In sum, there is a need for a device that enables to solve in an efficient manner the aforementioned problems of conventional methods for polymerizing lactams in molds.

SUMMARY

The present disclosure provides a device for polymerizing lactams in molds, in which the three components of the polymerization reaction (lactam, initiator and activator) are fed and dosed independently from one another into a mold, through a mixing chamber located at the entrance of the mold. The initiator and the activator are liquid at room temperature. Furthermore, the lactam needed for each part is melted at the moment immediately prior to or just before being introduced into the mold by means of a plasticizing screw.

According to an aspect of the present disclosure, a device for polymerizing lactams in molds is provided. Said device comprises: a hopper to store solid lactam; a lactam feeding means configured for receiving the solid lactam from the hopper, wherein said feeding means comprises a plasticizing screw configured to melt the lactam while simultaneously taking the molten lactam in a dosed manner towards a mixing chamber. The device further comprises: first dosing means for feeding a liquid initiator; second dosing means for feeding a liquid activator; wherein the mixing chamber is configured to receive, in a dosed manner, the lactam, the initiator and the activator, respectively from the lactam feeding means, the first dosing means and the second dosing means, said mixing chamber having three separate inlets to receive the lactam, the initiator and the activator separately, so as to allow said lactam, initiator and activator respectively to flow into the mixing chamber, coming into contact with one another for the first time at the moment immediately prior to entering a mold located next to the chamber and so arranged for the polymerization reaction to take place inside the mold. In other words, the lactam, the initiator and the activator flow inside the mixing chamber and immediately afterwards, they access the aforementioned mold.

Preferably, the first dosing means for feeding the initiator, comprises a syringe propeller attached to the first inlet of the mixing chamber and the second dosing means for feeding the activator, comprises a syringe propeller attached to the second inlet of the mixing chamber.

Preferably, the lactam feeding means comprises means for controlling the lactam dose that reaches the mixing chamber by controlling the rotation of the plasticizing screw. The plasticizing screw is preferably surrounded by heating means.

In one possible embodiment, the lactam feeding means is an extruder configured for melting the lactam in the plasticizing screw and taking it towards the mixing chamber.

Preferably, the device further comprises a nozzle arranged between the mixing chamber and the mold, the nozzle being configured to receive the mixture formed by the lactam, the initiator and the activator in a dosed manner and to take said mixture to the mold.

In one possible embodiment, the extruder is inclined relative to the horizontal, at an angle ranging between 10 and 35 degrees.

The mixing chamber preferably comprises a pumping system configured for pumping the dosage of the moisture of lactam, initiator and activator in a substantially continuous manner. This pumping system preferably is a piston pump.

In another possible embodiment of the device, which comprises an extruder, the mixing chamber is configured in such a way that at the outlet thereof, the initiator and the activator come out through the central portion of the chamber section, whereas the lactam flow comes out though the perimetrical portion, in such a way that it is in the nozzle where the three components come into contact for the first time.

In yet another possible embodiment, the lactam feeding means is an injector configured to melt the lactam in said plasticizing screw, to take it towards said mixing chamber in a dosed manner and by means of the same plasticizing screw, used as a plunger, to push the lactam, the initiator and the catalyst mixture through a nozzle towards the mold.

Additional advantages and characteristics of the disclosure will become apparent from the following description.

BRIEF DESCRIPTION OF THE DRAWINGS

To complete the description and with the aim of achieving a better understanding of the features of the disclosure, according to a practical embodiment thereof, and attached as an integral part of the description is a set of figures wherein by way of non-limiting example, the following has been represented:

FIG. 1 is a schematic diagram that represents a device according to a first embodiment of the present disclosure;

FIG. 2 represents the outlet section of the mixing head, according to a first embodiment of the present disclosure;

DETAILED DESCRIPTION OF THE DRAWINGS

Figure 3:
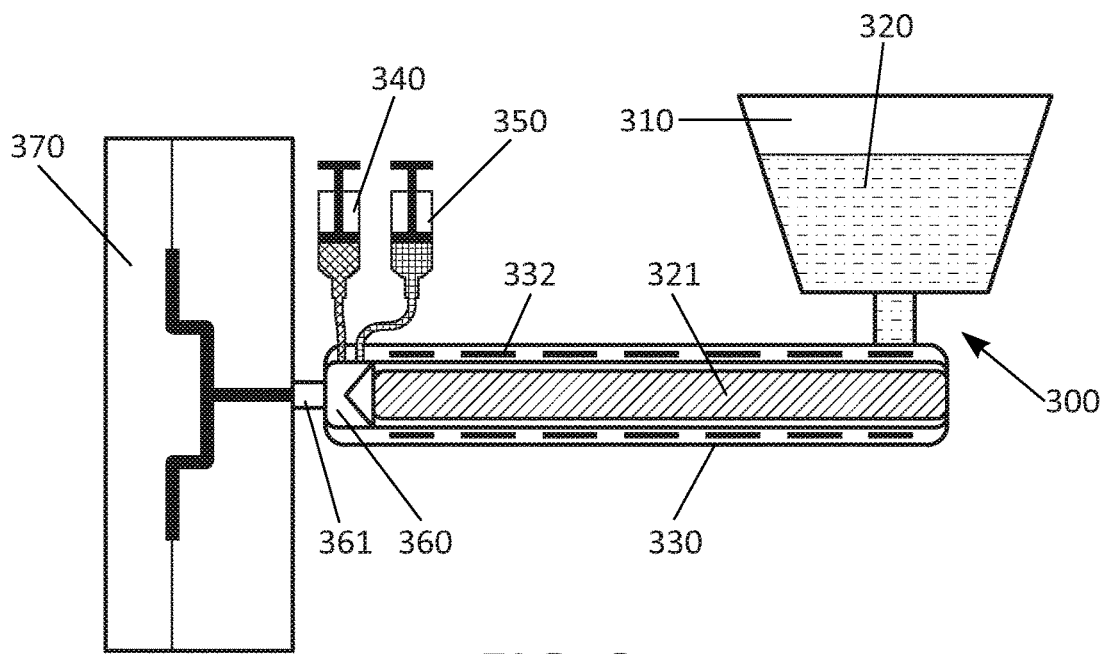
FIG. 3 is a schematic diagram that represents a device according to a second embodiment of the present disclosure.

In this text the word "comprises" and its variants (such as "comprising", "comprise", etc.) should not be interpreted in an exclusive manner, that is, they do not exclude the possibility that what is described includes other elements, steps, etc.

In the context of the present disclosure, the word "approximately" and other words belonging to the same family (such as "approximate", etc.) should be understood to indicate values close to those accompanying the aforementioned word. That is, any deviation from an exact value within reasonable limits should be accepted, because any person with an average skill in the art will understand that such deviation from the values given is unavoidable due to measurement inaccuracies, etc. The same can be applied to the words "around" and "substantially".

The following description should not be interpreted by way of limitation since it is solely provided to describe the broad principles of the disclosure. By way of example, the following embodiments of the disclosure will be described, making reference to the aforementioned drawings, which represent the apparatus, elements and results, according to the disclosure.

The method for polymerizing lactams of the present disclosure comprises: feeding a mold, through a mixing chamber, with a lactam, an activator and an initiator, wherein the activator and the initiator are in liquid state at room temperature. The lactam, the initiator and the activator are independently fed to the mixing chamber.

The lactam can be selected, for example, from the group comprising β-lactam, γ-lactam, δ-lactam, ε-lactam and laurolactam, etc.

The initiator can be isocyanates and derivatives thereof, as well as acyl-lactams, ureas and carboimides, provided that they are in liquid state at room temperature.

The activator can be can be lactamates of alkali metals such as metal salts of sodium or magnesium, hydrates, hydroxides and metal amines or other organometallic compounds, provided that they are in liquid state at room temperature.

The control of the mechanical properties of the molded material is achieved by acting on the concentration of the catalytic system (activator and initiator), on the lactam and/or the combination of several lactams, and on the process and post-process conditions.

The control of all the components, either electric or pneumatic, is centralized in a control means, for example, an electric cabin in which specific software for controlling this process has been installed. This control means is not illustrated in the figures.

One of the problems solved by any of the implementations of the disclosure is related with the difficulty for melting and dosing both the initiator and the activator at high temperatures. Both materials must be added to the mixture in specific percentages (for example, within the intervals of 0.5-2% by weight, relative to the lactam weight), which makes difficult its correct dosage using gear pumping means. Furthermore, as it already has been explained, the solid initiators and the activators must be melted at temperatures higher than room temperature. In addition, when they are melted, these initiators and activators present viscosities that depend on temperature. Consequently, the temperature of these materials must be constant and accurate throughout the entire dosing process.

In this way, catalyst systems (initiators and activators) which are liquid and stable at room temperature, are used. This allows simplifying the method for polymerizing and molding lactams and to simplify the device used for this end, as compared to those described in the state of the art. This simplification implies a significant reduction in the number of elements that form the device, mainly thermal elements, as well as a reduction in the number of containers and dosing tubes.

A second problem solved by any of the variants described in the disclosure is related with the melting capacity of the lactam inside a dosing system by means of a plasticizing screw. This plasticizing screw, either by means of an extrusion system or by means of an injection system, melts a fraction of the solid lactam placed in a hopper at the end of the screw, and doses it continuously to the mixing chamber. In other words, the plasticizing screw melts the solid lactam as it accesses the extrusion or injection system and takes it in a molten state towards a mixing chamber. Both actions—melting and conduction—are carried out simultaneously or in a substantially simultaneous manner. This allows melting solely the amount of lactam necessary for making each part, at the moment immediately prior to being introduced into the mixing chamber. This melting is carried out in very short periods of time owing to the fact that it is a relatively small quantity. With this melting/dosing method, there is less risk for the lactam to be exposed to thermal degradation or moisture and the device consumes less energy than in the melting methods described in the state of the art.

Furthermore, the new devices, based on simpler elements, enable dosing each component more accurately, thanks to the control means based on a software that automatically calculates the operating parameters of the device (speed and operating times of the dosing systems) on the basis of the final volume of the part that is being manufactured, and the percentages of lactam, initiator and activator being used.

First Embodiment of the Disclosure

Making reference to FIG. 1, there is a schematic diagram representing a device for polymerizing lactams in molds, according to a first embodiment of the disclosure. The system 100 comprises a hopper 110 for storing the solid lactam 120 at room temperature. Preferably, the hopper 110 keeps the lactam under a dry atmosphere, such as, for example, a nitrogen atmosphere. From the hopper 110 and by means of a feeding means, the lactam is dosed into a mold 170 through a mixing chamber 160, which is described below in more in detail.

In FIG. 1, the feeding means is an extruder 130. In this extruder 130, due to the pushing action generated by the rotating motion of a plasticizing screw 131, which rotates concentrically in an internal chamber at controlled temperatures, the lactam is melted and flows continuously. The plasticizing screw 131 is surrounded by heating means 132, such as electrical resistances. The molten lactam has a temperature comprised between 70 and 155° C. Preferably, its temperature is comprised between 135 and 145° C., both inclusive.

The molten lactam is forced to pass through a nozzle—located at the end of the extruder—as a result of the thrust exerted by said plasticizing screw. The extruder 130 is controlled by means of an engine, not illustrated, which is able to regulate the rotational speed (flow control) and stopping once the necessary amount of lactam has been dosed towards the mixing chamber 160 and that there is enough lactam to fill the mold 170. Thanks to the action of the plasticizing screw 131, the lactam needed for each part is melted at the moment immediately prior to being introduced into the mold 170.

The molten lactam enters the mixing chamber 160 at the same time than the initiator and the activator, which are placed in two independent dosing devices 140 and 150. Initiator and activator enter the mixing chamber 160 through two independent pipes, which cross the chamber 160 until reaching the exterior, where a nozzle 161 is located. The three materials (lactam, initiator and activator) flow along independent pipes inside the mixing chamber 160 until reaching the exit of the chamber. It is at the entrance of the nozzle 161 where the three components (lactam, initiator and activator) come into contact for the first time, the three components being mixed as they pass through it and come outside to be deposited in a mold 170. That is to say, the three components that form the mixture do not enter into contact with one another until some moments before accessing the mold. Namely, the lactam, the initiator and the activator come into contact with one another for the very first time when they abandon the chamber 160 and access the nozzle 161 that allows them to pass through in order to reach the mold 170. This implies that the three components are mixed inside the device (specifically, in the nozzle 161 that gives access to the mold 170) only during the time it takes for the mixture to cross it, without stopping, depending on the flow rate that has been defined.

Moreover, the initiator and the activator are placed in the respective dosing devices 140 and 150, which are independent from one another and able to dose them at room temperature. In a preferred embodiment, these dosing devices 140, 150 are piston pumps (plungers), such as syringe propellers located near the mixing chamber 160, as it can be seen in FIG. 1. These dosing devices 140, 150 are further detailed after the third embodiment of the disclosure, since the three implementations are quite similar to one another.

The mixing chamber 160 has three components, i.e., it has three independent inlets and one single outlet. Preferably, the temperature of the mixing chamber 160 is regulated by means of flat resistances, in order to prevent the lactam from solidifying and to keep the temperature of the mixture (casting temperature) under control.

The activator and initiator proportion accessing the mixing chamber 160 is controlled by setting the flow rates of the respective plunger dosing means 140, 150. The lactam proportion accessing the mixing chamber 160 is controlled by setting the flow rate or flow (rotational speed) of the plasticizing screw 131. In this way, the relationship between the three flow rates coincides with the ratio of the mixture needed for a correct polymerization.

Preferably, the mixing chamber 160 is made in stainless steel. Also preferably, both the lactam and the catalytic system (activator and initiator) are introduced through the upper portion, parallel to the longitudinal axis of the head. The pipes, which come into contact only with the activator and the initiator pass through two holes on the upper portion. This is schematically illustrated in FIG. 2.

The tri-component chamber is intended to drive the flows of the three materials, lactam, activator and initiator, to the nozzle without their coming into contact with one another. The objective is that the catalytic system (initiator and activator) cross the chamber through the central portion of the mixing chamber, whereas the lactam flow is distributed along the perimetrical portion, as represented in FIG. 2

(lactam 162, initiator 163 and activator 164). The materials come into contact with one another only when they are outside the present part and as they enter the nozzle.

The three components (lactam, initiator and activator) are mixed inside the nozzle 161, which is located at the exit of the mixing chamber 160. The nozzle 161 facilitates the access of the flow to the mold 170, which has been previously heated (to approximately 165-180° C.), wherein the polymerization reaction takes place. The molding process is carried out at low pressure (from 0 to 3 bars) according to the volume, geometry of the part to be obtained and to the expected filling time; the accuracy of the mold temperature depends on the expected reaction rate and on the percentage of activator and initiator used.

Second Embodiment of the Disclosure

Making reference to FIG. 3, there is a schematic diagram representing a device for polymerizing lactams in molds, according to a second embodiment of the disclosure. The system 300 comprises a lactam hopper 310 for storing the solid lactam 320 at room temperature. Preferably, the hopper 310 keeps the lactam under a dry atmosphere, such as, for example, a nitrogen atmosphere. From the hopper 310 and through a feeding means, the lactam is dosed into a mold 370 through a mixing chamber 360, as described below.

The lactam is taken to the chamber 360 through a feeding means. In fact, the chamber 360 is located at the end of the feeding means. In FIG. 3, the feeding means is an injector 330. Like in the first embodiment, the solid lactam 320 is fed from the hopper 310 towards the opposite end of the injector 330. In the injector, due to the pushing action exerted by the rotating motion of a plasticizing screw 331, which rotates concentrically in an internal chamber at controlled temperatures, the lactam melts and flows in a continuous manner. The plasticizing screw 331 is surrounded by heating means 332, such as resistances. The molten lactam has a temperature comprised between 70 and 155° C. Preferably, its temperature is comprised between 135 and 145° C., both inclusive. Unlike the extruder 130 of the previous embodiment, the injector 330 comprises at the end of the screw 331 an injection system, which by means of a plunger (formed by the screw 331 itself) exerts a pressure motion and introduces the lactam, after being mixed with the initiator and the catalyst, into the mold. That is to say, for each pressure surge of the screw/plunger 331, a specific amount of lactam and catalytic system mixture accesses the mold 370 through the nozzle 361 located at the exit of the chamber 360 of the injector. The molten lactam accesses the chamber 360 at the same time than the other two components, i.e., initiator and activator, through the dosing devices 340, 350, which are similar to those of the first embodiment. Thanks to the action of the plasticizing screw 331, the lactam necessary for each part is melted at the moment immediately prior to being introduced into the mold 370 through the nozzle 361.

Like in the first embodiment, the flows of the three materials—lactam, activator and initiator—are intended to remain separated and independent until the moment immediately prior to their entry into the mold 370. In this second embodiment, the three components come into contact only in the chamber 360, from where they are injected into the mold 370 due to the pressure exerted by the screw or plunger 331. That is to say, the three components that form the mixture do not enter into contact with one another until some moments prior to accessing the mold. Specifically, the lactam, the initiator and the activator come into contact with one another for the first time in the chamber 360, which is separated from the mold 370 only by the nozzle 361. This implies that the three components are mixed inside the device only during the time it takes for the mixture to cross it, without stop, depending on the flow rate that has been defined.

The molten lactam enters the chamber 360 at the same time as the initiator and the activator, which access the chamber 360 through two independent dosing devices 340, 350 (preferably the dosing is carried out by means of a piston at room temperature). The chamber 360 discharges its content through the nozzle 361 into the mold 370. The temperature of the chamber 360 is regulated by means of the same system of resistances 332, which heats the screw 331, in order to prevent the lactam from solidifying and to keep the temperature of the mixture (casting temperature) under control.

The proportion of activator and initiator accessing the chamber 360 is controlled by setting the flow rates of the respective plunger dosing means 340, 350. Like in the first embodiment, the lactam ratio accessing the mixing chamber 360 is controlled by setting the flow rate or flow (rotational speed) of the plasticizing screw. In this way, the ratio of the three flow rates coincides with the mixture ratio needed for a correct polymerization.

Moreover, the initiator and the activator are placed in their respective dosing devices 340, 350, which are independent from one another. In a preferred embodiment, these dosing devices 340, 350 are piston pumps (plungers), such as syringe propellers located near the chamber 360, as it can be seen in FIG. 3. These dosing devices 340, 350 are further detailed below, on the third embodiment of the disclosure, since said three implementations are quite similar to one another.

The mold 370 is pre-heated (to approximately 165-180° C.), and the polymerization reaction takes place therein. The molding process is carried out at low pressure (from 0 to 3 bars) according to the volume, geometry of the part to be obtained and the expected filling time; the accuracy of the mold temperature depends on the expected reaction rate and on the percentage of activator and initiator used.

Third Embodiment of the Disclosure

Figure 4:
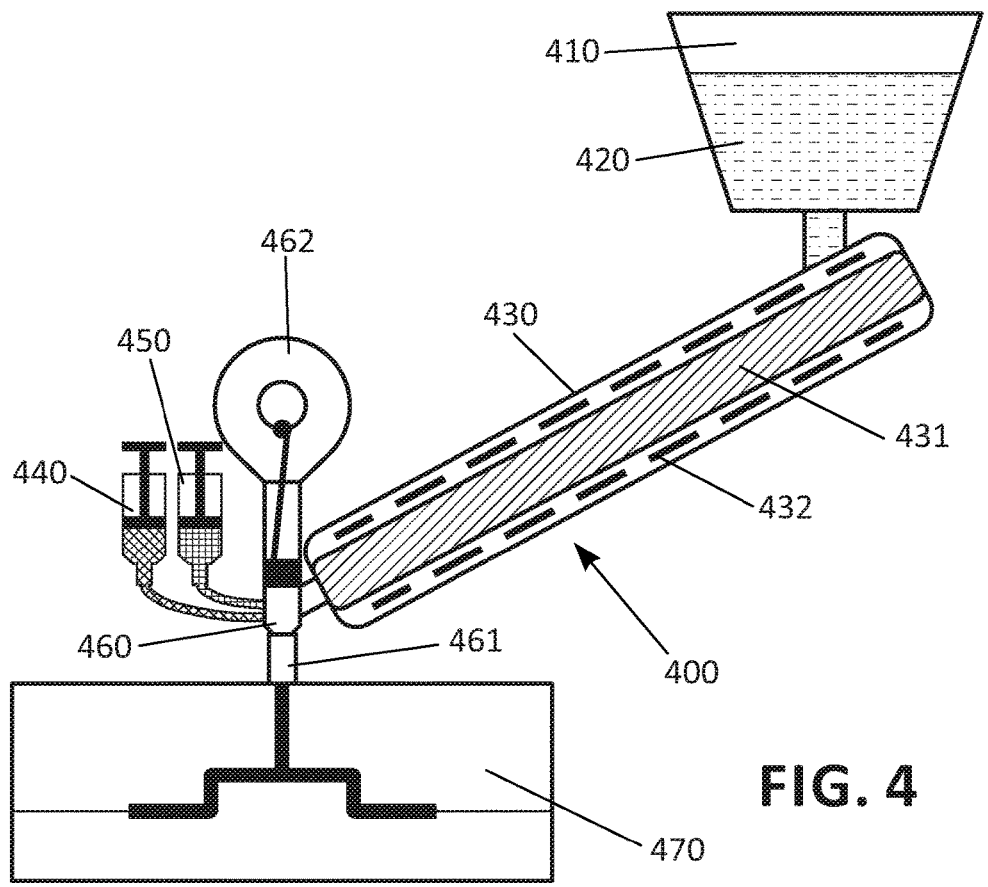
FIG. 4 is a schematic diagram that represents a device according to a third embodiment of the present disclosure.

Making reference to FIG. 4, there is a schematic diagram representing a device for polymerizing lactams in molds, according to a third embodiment of the disclosure. The system 400 comprises a lactam hopper 410 for storing the solid lactam 420 at room temperature. Preferably, the hopper 410 keeps the lactam under a dry atmosphere, such as, for example, a nitrogen atmosphere. From the hopper 410 and by means of a feeding means, the lactam is dosed to a mold 470 through a mixing chamber 460, which is described in more in detail, below.

The lactam is taken to the chamber 460 through a feeding means. In FIG. 4, the feeding means is an extruder 430. The lactam 420 is fed from the hopper 410 towards the extruder 430 end. In the extruder, due to the pushing action exerted by the rotating motion of a plasticizing screw 431, which rotates concentrically in an internal chamber at controlled temperatures, the lactam melts and flows in a continuous manner. The plasticizing screw 431 is surrounded by heating means 432, such as electrical resistances. The molten lactam has a temperature comprised between 70 and 155° C. Preferably, its temperature is comprised between 135 and 145° C., both inclusive. The molten lactam is forced to pass through a nozzle as a result of the thrust exerted by said plasticizing screw. The extruder 430 is preferably inclined relative to the horizontal at an angle $\alpha$. In a preferred embodiment, this angle $\alpha$ varies between 10 and 35 degrees. The inclination prevents, in opposition to the completely horizontal position, the molten lactam from moving back towards the rear portion of the extruder when it moves in the plasticizing screw 431.

The molten lactam enters the mixing chamber 460 in a continuous manner. Simultaneously, the initiator and the activator also reach the chamber 460, which (initiator and activator) are placed in two independent dosing devices 440, 450 (preferably dosed by means of a piston at room temperature). Initiator and activator enter the mixing chamber 460 through two independent pipes. Thanks to the action of the plasticizing screw 431, the lactam needed for each part is melted at the moment immediately prior to being introduced into the mold 470 through the nozzle 461.

Moreover, the initiator and the activator are placed in their respective dosing devices 440, 450, which are independent from one another. In a preferred embodiment, these dosing devices 440, 450 are piston pumps (plungers), such as syringe propellers located near the mixing chamber 460, as it can be seen in FIG. 4. These dosing devices 440, 450 are further detailed below, after the third embodiment of the disclosure, since in the three implementations they are quite similar to one another.

A pumping system 462 complements the mixing chamber 460. In one particular embodiment, the pumping system is a piston pump 462. Preferably, the pumping system additionally comprises an engine. The dosing of the pump 462 is controlled by means of the engine.

Thus, once a small portion (for example, some milligrams,) of the three materials has been introduced into the mixing chamber 460, the pump 462 exerts a thrust or pressure surge towards the nozzle 461, located in connection with the mold 470. By way of example, the pump 462 exerts several thrust per second. In this way, the pumping and therefore the mixture feeding aimed towards the mold are almost continuous or substantially continuous. The capacity of the mixing chamber 460, together with the number of pushes exerted by the pump 462 and with the rate at which the pump 462 exerts those pushes (pushes/second or rotations/second) define both the inlet flow rate of the lactam, initiator and activator mixture, as well as the amount of mixture needed to fill the mold 470.

In this way, the three materials (lactam, initiator and catalyst) come into contact for the first time, as it was the case in the embodiments 1 and 2, at the moment immediately prior to being introduced into the mold. In addition, the feeding action from the chamber 460 towards the mold 470 is substantially continuous due to the dosing action of the pump 462. That is to say, the three components forming the mixture do not come into contact with one another until some moments prior to accessing the mold. Specifically, the lactam, the initiator and the activator come into contact with one another for the first time in the chamber 460, which is separated from the mold 470 only by the nozzle 461. This implies that the three components are mixed inside the device only during the time it takes for the mixture to cross it, without stop, depending on the flow rate that has been defined.

In a particular embodiment, the temperature of the mixing chamber 460 may be regulated, for example, by means of electrical resistances, in order to prevent the lactam from solidifying and to keep the temperature of the mixture (casting temperature) under control.

The proportion of activator and initiator accessing the mixing chamber 460 is controlled by setting the flow rates of the respective plunger dosing means 440, 450. The proportion of lactam accessing the mixing chamber 460 is controlled, like in previous embodiments, by setting the flow rate or flow (rotational speed) of the plasticizing screw. In this way, the ratio between the three flow rates coincides with the ratio of the mixture needed for a correct polymerization.

The mixture coming out the chamber 460 crosses the nozzle 461 and deposits in a continuous manner into the pre-heated mold 470 (to approximately 165-180° C.), wherein the polymerization reaction takes place The molding process is carried out at low pressure (from 0 to 3 bars) according to the volume, geometry of the part to be obtained and the expected filling time; the accuracy of the mold temperature depends on the expected reaction rate and on the percentage of activator and initiator used.

Next, the dosing devices 140 150 340 350 440 450, which are similar in the three embodiments of the disclosure, are detailed: The syringe propellers are formed by an engine that rotates a shaft at the end of which the syringe plunger (piston) is fixed. In each embodiment, two syringe propellers are used, one per component (initiator and activator). The dosing devices 140 150 340 350 440 450 are at room temperature. By controlling the piston travel, the flow rate and the volume of the doses are controlled. In order to attach the syringes to the chambers 160 360 or 460 (depending on the embodiment), flexible hoses are used, for instance, hoses made of silicone. Aside from allowing an accurate control of the dosing, syringe propellers are recommended because the parts of these dosing devices coming into contact with the activator or the initiator (for example plastic syringes and silicone hoses) are disposable. This solves the problem related to their cleaning. In this way, the dosing control is independent and it is possible to modify the proportion of these components easily.

The materials used in the dosing elements of the catalytic system (activator and initiator) are preferably disposable, given that the catalytic system requires optimal cleaning conditions and cleaning these elements is complicated.

The control of the exact doses is achieved by means of a shaft connected to an engine with a metering device. Therefore, the flow rate is regulated by means of the rotational speed of the engine and the volume of the dose is regulated by means of the meter device, based on the number of revolutions.

Next, a procedure for molding polyamide pieces 6 at an industrial scale using the device of the third embodiment of the disclosure is described:

a) Preparing the materials: it must be guaranteed that the moisture percentage of the reaction components is less than 0.04%.

b) The molds are heated at molding temperature.

c) Turning on the equipment: the machinery is turned on with the main switch and the temperatures of the areas to be heated are programmed. Said areas are: the resistances area of the extruder and the heating area of the mixing chamber.

d) The caprolactam is introduced into the hopper. The amount to be introduced is a function of the hopper capacity. Since the material is kept at a solid state and protected from moisture inside the hopper, there is no possibility of degradation and this hopper can be used to store the lactam.

e) Programming the rotational speeds of the extruder and calibrating to verify the flow of lactam obtained.

f) Loading the catalytic system: according to the mixture proportion intended to be used, the syringes are loaded and connected to the corresponding silicone pipes. Finally, they are placed on the corresponding syringe propeller introducing the pipes into the mixing chamber.

g) Checking the calibration of the catalytic system: to do so, a flow rate is programmed independently at each propeller and the amount is collected in a vessel with a calculated tare, which will be weighted.

h) Priming the propellers: a priming of the propellers is carried out in such a way that the activator and the initiator fill completely the silicone pipe.

i) Injecting the material inside the mold: the weight of the part to be obtained is programmed as well as the % of the catalytic system. The software calculates automatically the parameters of the piston pump, depending on these two factors (weight of the part and % of the catalytic system). The nozzle is connected to the mold and the injection begins. After filling the mold, the nozzle is disconnected and they are allow to react.

j) Cleaning the nozzle: immediately after disconnecting the mold, the nozzle is cleaned to retire all traces of caprolactam/initiator/activator.

k) Unmolding the part: once the material has solidified, the part is cooled down, after which it is extracted from the mold.

l) Repeat injections: if several consecutive injections are going to be carried out, once step j) has concluded, it is possible to come back to step h) and carry out injections inside different molds. These castings can present different weights and % of the catalytic system, by just modifying the mixture ratio and the weight of the part in the software program.

EXAMPLES OF THE OPERATION OF THE DEVICE OF FIG. 4

Example 1

If it is pretended to mold a polyamide piece 6 of 1.03 kg, in 10 seconds (filling time of the mold) in which the mixture ratio is: 100 parts of lactam (namely, caprolactam), 2 parts of initiator, and 1 part of activator, the method is described as follows.

The starting point is a hopper 410 which contains enough caprolactam, and the syringe propellers 440, 450 are respectively filled with initiator and activator. The resistances 432 are programmed at 145° C. and the resistance of the chamber 460 is programmed at 115° C.

The three dosing systems (caprolactam, initiator and activator) are activated. The extruder 430 doses and melts the caprolactam simultaneously from the hopper 410 through the plasticizing screw 461, and takes it to the mixing chamber 460 with a constant and continuous flow of 100 g/s during 10 seconds.

At the same time/in parallel, the syringe propellers 440, 450 dose the activator and the initiator through silicone tubes up to the mixing chamber 460, with a continuous and constant flow rate of 2 g/s of initiator and 1 g/s of activator.

The three flows of caprolactam, initiator and activator meet and come into contact with one another for the first time upon their entering into the small mixing cavity 460. In order to obtain a homogeneous mixture, which remains constant, the piston pump 462 pushes the mixture through the nozzle 461 at a speed of 20 pushes/s. The nozzle 461 is connected to the mold 470 heated up to 170° C., which is continuously filled during the same 10 seconds in which the dosing of the three components takes place. Once the 1.03 kg of mixture have been dosed in the 10 s scheduled, the dosing means (extruder 430 and syringe dispensers 440, 450) come to a stop. Once the reaction has taken place inside the mold, the mixture becomes solid and the polyamide piece 6 is extracted from the mold.

Example 2

Once the method described in example 1 has concluded, and without having to turn off the machine, clean it or introduce new raw materials (caprolactam, initiator or activator), a second polyamide piece 6, which has a weight of 205 g, is manufactured in 4 seconds (filling time of the mold) in which the proportion of the mixture is: 100 parts of caprolactam, 1.5 parts of initiator and 1 part of activator.

The three dosing systems are activated (caprolactam, initiator and activator). The extruder 430 doses and melts the caprolactam simultaneously from the hopper 410 and through the plasticizing screw 461, and takes it to the mixing chamber 460 with a constant and continuous flow rate of 50 g/s during 4 seconds.

At the same time/in parallel, the syringe propellers dose the activator and the initiator through silicone tubes up to the mixing chamber 460, with a continuous and constant flow rate of 0.75 g/s of initiator and 1 g/s of activator.

Like in example 1, the three flows of caprolactam, initiator and activator meet and come into contact with one another for the first time upon their entering into the small mixing cavity 460. To obtain a homogeneous mixture, which remains constant, the piston pump 462 pushes the mixture through the nozzle 461 at a rate of 17 pushes/s. The nozzle 461 is connected to the mold 470, heated up to 165° C., which is continuously filled during the same 4 seconds in which the dosing of the three components takes place. Once the 205 g of mixture have been dosed in the 4 s scheduled, the dosing means (extruder 430 and syringe dispensers 440, 450) come to a stop. Once the reaction has taken place inside the mold, the mixture becomes solid and the polyamide piece is extracted from the mold.

Moreover, the disclosure is not limited to the specific embodiments that have been described therein, instead it also encompasses, for instance, the variants that a person with an average skill in the art may realize (for example, as far as the choice of materials, size, components, configuration, etc., is concerned), within the scope of the claims.

The invention claimed is:
1. A device for polymerizing lactams in molds, comprising:
 a hopper for storing solid lactam;
 a lactam feeding means configured to receive the solid lactam from the hopper, wherein said lactam feeding means comprises a plasticizing screw configured to melt the lactam and simultaneously drive the molten lactam in a dosed manner towards a mixing chamber, the plasticizing screw dosing the molten lactam into the mixing chamber in a continuous way;
 the device further includes:
 a first dosing means for feeding a liquid initiator;
 a second dosing means for feeding a liquid activator;
 wherein said mixing chamber is configured to receive in a dosed manner the lactam, the initiator and the activator, from respectively said lactam feeding means, said first dosing means and said second dosing means, said mixing chamber having three separate inlets for receiving, separately, the lactam, the initiator, and the activator, so as to allow the lactam, the initiator, and the activator respectively to flow into the mixing chamber, coming into contact with one another for the first time at the moment immediately prior to entering a mold located next to the chamber and arranged for the polymerization reaction to take place inside the mold.

2. The device according to claim 1, wherein the first dosing means for feeding the initiator, comprises a syringe propeller attached to the first inlet of the mixing chamber and the second dosing means for feeding the activator, comprises a syringe propeller attached to the second inlet of the mixing chamber.

3. The device according to claim 1, wherein said lactam feeding means comprises means for controlling the lactam dose accessing the mixing chamber by controlling the rotation of the plasticizing screw.

4. The device according to claim 1, wherein said plasticizing screw is surrounded by heating means.

5. The device according to claim 1, wherein the lactam feeding means is a extruder configured for melting the lactam in said plasticizing screw and taking the lactam towards said mixing chamber.

6. The device according to claim 1, which further comprises a nozzle arranged between the mixing chamber and the mold, being said nozzle configured to receive the mixture formed by the lactam, the initiator and the activator in a dosed manner and to deliver said mixture to the mold.

7. The device of claim 5, wherein said extruder is inclined relative to the horizontal at an angle ranging between 10 and 35 degrees.

8. The device of claim 5, wherein the mixing chamber comprises a pumping system configured for pumping the dose of the lactam, initiator and activator mixture in a substantially continuous manner.

9. The device of claim 8, wherein said pumping system is a piston pump.

10. The device according to claim 6, wherein the mixing chamber has an outlet and is configured such that at the outlet, the initiator and the activator come out through the central portion of the section of said chamber, whereas the lactam flow comes out through the perimetrical portion such that the lactam is disposed in the nozzle where the three components come into contact for the first time.

11. The device according to claim 1, wherein the lactam feeding means is an injector configured to melt the lactam in said plasticizing screw, to take the lactam towards said mixing chamber in a dosed manner and by means of the same plasticizing screw used as an plunger, to push the lactam, the initiator and the catalyst mixture through a nozzle towards the mold.

* * * * *